Patented June 23, 1931

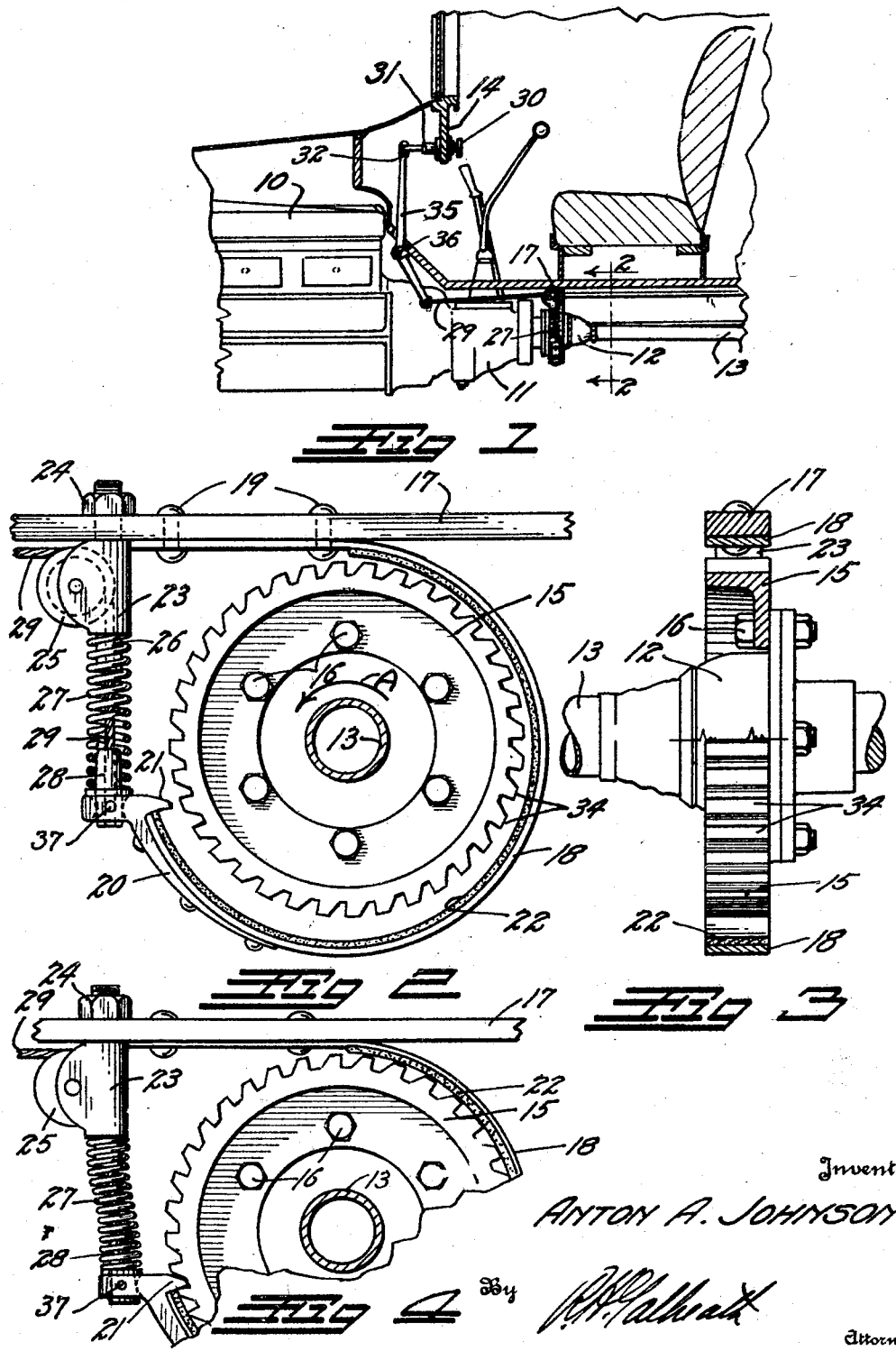

1,811,635

UNITED STATES PATENT OFFICE

ANTON A. JOHNSON, OF LOVELAND, COLORADO

SAFETY DEVICE FOR AUTOMOBILES AND THE LIKE

Application filed May 19, 1930. Serial No. 453,480.

This invention relates to a safety device for automobiles and trucks and has for its principal object the provision of a mechanism which will enable the driver to start from a standing stop upon a steep hill without danger of the car backing down the hill before the clutch and transmission are engaged.

It is exceedingly difficult to start an automobile from a stand upon a steep hill, owing to the fact that the car can not be started with the emergency brake on and if the brake is released the car will often back down the hill before the clutch can be engaged. It may gain such momentum that the clutch can not be engaged or if engaged the engine will be killed and reversed as to direction, thus resulting in a serious accident. With the use of this invention the driver can release his brakes without danger of retrograde movement of the car. He can then engage his clutch and the instant the car starts forward the safety device will be automatically released and inoperative.

Another object of the invention is to so construct the device that it can be readily attached to the present types of automobiles and trucks without change in the present mechanism.

A further object of the invention is to so construct the device that it will not interfere with forward driving or with intentional backing of the car.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

Fig. 1 is a fragmentary longitudinal section through an automobile illustrating the position of the safety device thereon.

Fig. 2 is an enlarged front view of the safety device.

Fig. 3 is a side elevation thereof partially broken away illustrating the method of attaching the device to a typical universal joint in the propeller shaft of an automotive vehicle.

Fig. 4 is a detail view illustrating the pawl tooth engaged in the teeth of the ratchet gear.

Typical parts of an automobile are illustrated and indicated by numerals as follows: engine 10; transmission housing 11; universal joint 12; propeller shaft 13; and instrument board 14.

The invention comprises a ratchet gear 15 which is designed to be attached to the flange of the universal joint 12 immediately back of the transmission 11 and below the floor of the car. The ratchet gear is preferably held in place by means of the regular studs 16 which are employed for holding the two parts of the usual universal point casing together.

Immediately above the ratchet gear 15 a cross bar 17 is secured, extending between the two side rails of the automobile chassis. A brake band 18 is secured at its one extremity to the cross bar 17 by means of suitable bolts or rivets 19. The other extremity of the brake band 18 carries a ratchet pawl member 20 having a pawl tooth 21 to engage the teeth of the ratchet gear 15. The inner face of the brake band 18 is lined with suitable brake lining 22.

A spring bracket 23 is secured on the underside of the cross bar 17 by means of a suitable clamp nut 24. The bracket 23 is provided with a guide pulley 25 and a reduced lower extremity 26 adapted to pass into a helical compression spring 27. An attachment terminal 28 is pivoted on a pin 37 in the ratchet pawl member 20. The terminal 28 passes into the opposite extremity of the spring 27.

A flexible medium such as a chain or a cable 29 is secured in the attachment boss 20 and passes upwardly, through the spring 27 and the bracket 23, around the guide pulley 25. The cable 29 may be operated in any desired manner. One of the preferred methods is to attach the extremity of the cable to a lever 35 which fulcrumed in a bracket 36 so as to extend upwardly in back of the instrument board 14. A dash control rod 30 is operatively connected to the upper extremity of the lever 35 as shown at 32. The rod 30 is of the type adapted to be pulled outwardly by means of a finger button and is carried in a sleeve 31 secured to or through the instrument board 14.

The spring bracket 23 is rotatable so that it can be turned to direct the guide pulley 25 in any direction depending upon where it is desired to position the control cable. The cable terminal 28 is free to turn on the pivot pin 37 to follow the direction of pull of the cable 29.

Let us assume that the driver stops his car while ascending a hill. He immediately pulls the dash control 30 outward. This causes the cable 29 to raise the extremity of the brake band 18 so that the pawl tooth 21 will engage the tooth of the ratchet gear 15. As the car tends to move backward the ratchet teeth will pull against the pawl tooth 21 tightly clamping the brake band and the lining 22 against the periphery of the ratchet gear 15, so as to prevent rearward movement thereof, or a movement in a clock-wise direction in Fig. 3.

The pressure of the ratchet against the tooth 21 will maintain the device in the engaged position until it is desired to use the car. When the driver wishes to start up the hill, he will release his brakes and allow the pawl tooth 21 and the brake band 18 to prevent reversal of the car. He will then engage his clutch causing the ratchet gear 15 to move in the direction of the arrow "A" in Fig. 2. This immediately releases the pawl tooth 21 and allows the compression spring 27 to force the brake band 18 away from the ratchet gear. This will also draw upon the cable 29 causing the dash control 30 to return to its former position and the device will remain in the inoperative position until again required.

It will be noted that if the dash control is pulled outwardly when the car is moving forward no damage will result since the beveled face of the ratchet teeth and the beveled face on the pawl tooth 21 will simply slide over each other without engagement.

It is desired to call attention to the unusual construction of the teeth on the ratchet gear 15. These teeth are formed by indenting a series of ratchet-like notches in the periphery of the gear 15. These notches are spaced apart sufficiently to allow arcuate surfaces 34 upon each tooth which will provide a bearing surface for the brake lining 22. Since the band and lining engage the ratchet gear practically over its entire surface, they serve to greatly relieve the strain on the pawl tooth 21. The teeth are preferably slightly undercut to prevent the tooth 21 from slipping out of engagement until the pressure has been released thereon.

The safety device has been described herein as applied to an automobile or truck. It is, however, not limited to this use since it will also find application in any type of machine where it is desired to prevent a shaft from moving in one direction and yet leave it free to rotate in the other direction.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A safety device for preventing a reversal of the propeller shaft of an automobile comprising: a ratchet gear arranged for attachment to said propeller shaft; a brake band fixed at its one extremity and adapted to partially surround said ratchet gear; a pawl tooth positioned adjacent the free extremity of said brake band; and manually operated means for bringing said pawl tooth into engagement with the teeth of said ratchet gear so that rotation of the latter will act to clamp said brake band thereagainst.

2. A safety device for preventing a reversal of the propeller shaft of an automobile comprising: a ratchet gear arranged for attachment to said propeller shaft; a brake band fixed at its one extremity and adapted to partially surround said ratchet gear; a pawl tooth positioned adjacent the free extremity of said brake band; and manually operated means for bringing said pawl tooth into engagement with the teeth of said ratchet gear so that rotation of the latter will act to clamp said brake band thereagainst, said means comprising: an operating member and an operative connection between said latter member and the free extremity of said band.

3. A safety device for preventing a reversal of the propeller shaft of an automobile comprising: a ratchet gear arranged for attachment to said propeller shaft; a brake band fixed at its one extremity and adapted to partially surround said ratchet gear; a pawl tooth positioned adjacent the free extremity of said brake band; manually operated means for bringing said pawl tooth into engagement with the teeth of said ratchet gear so that rotation of the latter will act to clamp said brake band thereagainst; and a spring arranged to urge said pawl tooth out of engagement with said ratchet teeth.

4. A safety device for preventing a reversal of the propeller shaft of an automobile comprising: a cross bar supported by the chassis frame of said automobile; a ratchet gear secured to said propeller shaft immediately below said cross bar; a flexible band secured at its one extremity to said cross bar and arranged to partially surround said gear; a vertical movable member supporting the free extremity of said band; and a pawl tooth projecting from said free extremity so that when said extremity is moved upwardly it will engage the teeth of said ratchet gear to wrap said band thereabout.

5. A safety device for preventing a reversal of the propeller shaft of an automobile comprising: a cross bar supported by the chassis frame of said automobile; a ratchet gear secured to said propeller shaft immediately below said cross bar; a flexible band secured at its one extremity to said cross bar and arranged to partially surround said gear; a vertical movable member supporting the free extremity of said band; a pawl tooth projecting from said free extremity so that when said extremity is moved upwardly it will engage the teeth of said ratchet gear to wrap said band thereabout; and a spring arranged to constantly urge said free extremity downwardly and away from said gear.

6. A safety device for preventing a reversal of the propeller shaft of an automobile comprising: a crossbar supported by the chassis frame of said automobile; a ratchet gear secured to said propeller shaft immediately below said cross bar; a flexible band secured at its one extremity to said cross bar and arranged to partially surround said gear; a vertical movable member supporting the free extremity of said band; a pawl tooth projecting from said free extremity so that when said extremity is moved upwardly it will engage the teeth of said ratchet gear to wrap said band thereabout; a spring bracket secured to said band; a spring extending between said spring bracket and the free extremity of said band so as to force the latter away from said gear.

7. A safety device for preventing a reversal of the propeller shaft of an automobile comprising: a cross bar supported by the chassis frame of said automobile; a ratchet gear secured to said propeller shaft immediately below said cross bar; a flexible band secured at its one extremity to said cross bar and arranged to partially surround said gear; a vertical movable member supporting the free extremity of said band; a pawl tooth projecting from said free extremity so that when said extremity is moved upwardly it will engage the teeth of said ratchet gear to wrap said band thereabout; a spring bracket secured to said band; a spring extending between said spring bracket and the free extremity of said band so as to force the latter away from said gear; a pulley wheel mounted in said spring bracket; a flexible medium passing over said pulley wheel and terminating at said free extremity so as to move the latter.

8. A safety device for preventing a reversal of the propeller shaft of an automobile comprising: a cross bar supported by the chassis frame of said automobile; a ratchet gear secured to said propeller shaft immediately below said cross bar; a flexible band secured at its one extremity to said cross bar and arranged to partially surround said gear; a vertical movable member supporting the free extremity of said band; a pawl tooth projecting from said free extremity so that when said extremity is moved upwardly it will engage the teeth of said ratchet gear to wrap said band thereabout; a spring bracket secured to said band; a spring extending between said spring bracket and the free extremity of said band so as to force the latter away from said gear; a pulley wheel mounted in said spring bracket; a flexible medium passing over said pulley wheel and terminating at said free extremity so as to move the latter; a dash control, said flexible medium terminating in said dash control so that operation of the latter will cause said pawl tooth to engage the teeth of said ratchet gear.

9. The combination with the universal joint in the propeller shaft of an automobile of an annular ratchet gear adapted to be secured to and about said universal joint; and manually operated means for engaging said ratchet gear when desired so as to prevent reverse rotation of said propeller shaft.

In testimony whereof, I affix my signature.

ANTON A. JOHNSON.